United States Patent [19]

Iwatsuki et al.

[11] Patent Number: 5,109,731
[45] Date of Patent: May 5, 1992

[54] SHIFT CONTROL SYSTEM AND METHOD FOR AUTOMATIC TRANSMISSION

[75] Inventors: Kunihiro Iwatsuki; Hiromichi Kimura; Hideaki Otsubo, all of Toyota, Japan

[73] Assignee: Toyota Jidosha Kabushiki Kaisha, Toyota, Japan

[21] Appl. No.: 664,138

[22] Filed: Mar. 4, 1991

[30] Foreign Application Priority Data

Mar. 7, 1990 [JP] Japan .................................. 2-55992

[51] Int. Cl.$^5$ ...................... B60K 41/18; B60K 41/04
[52] U.S. Cl. ..................................... 74/866; 364/424.1
[58] Field of Search ......................... 74/866; 364/424.1

[56] References Cited

U.S. PATENT DOCUMENTS

| | | | |
|---|---|---|---|
| 4,669,335 | 6/1987 | Matsuoka et al. | 74/866 |
| 4,771,386 | 9/1988 | Yasuo et al. | 364/424.1 |
| 4,777,848 | 10/1988 | Taga et al. | 74/866 |
| 4,785,689 | 11/1988 | Iwatsuki et al. | 74/866 |
| 4,787,258 | 11/1988 | Yamamoto et al. | 74/866 |
| 4,790,215 | 12/1988 | Hamano | 74/866 |
| 4,811,223 | 3/1989 | Iwatsuki et al. | 74/866 |
| 4,841,813 | 6/1989 | Fujiwara et al. | 74/866 |
| 4,916,979 | 4/1990 | Irwin | 74/866 |
| 4,928,557 | 5/1990 | Takada et al. | 74/866 X |
| 4,930,081 | 5/1990 | Dunkley et al. | 74/866 X |
| 4,967,355 | 10/1990 | Iwatsuki et al. | 74/866 X |
| 4,984,484 | 1/1991 | Fujiwara et al. | 74/866 |

FOREIGN PATENT DOCUMENTS

60-116953 6/1985 Japan .
61-244957 10/1986 Japan .

Primary Examiner—Leslie A. Braun
Assistant Examiner—Daniel Wittels
Attorney, Agent, or Firm—Oblon, Spivak, McClelland, Maier & Neustadt

[57] ABSTRACT

A shift control system for an automatic transmission including first and second transmission assemblies, which are arranged in tandem to have their shifts controlled individually, and capable of selecting at least two gear stage trains, each being composed of a plurality of gear stages set by combining the first and second transmission assemblies, which are decided under a predetermined condition. It includes a running condition judgment device for judging the present running conditions including the set gear stages; a gear stage train decider for deciding such one of the gear stage trains as is suited for the running conditions; a gear stage train changer for changing one gear stage train to another; a simultaneous shift judgment device for judging if a change from the currently selected gear stage train to another gear stage train produces a simultaneous shift of both the first transmission assembly and the second transmission assembly; and a gear stage train change inhibitor for inhibiting changes of the decided gear stage trains if the simultaneous shifts are judged.

10 Claims, 6 Drawing Sheets

| SHIFT RANGE | B | | | | | | A | | GEAR RATIO |
|---|---|---|---|---|---|---|---|---|---|
| | C1 | C2 | C0 | B0 | B1 | B2 | B3 | 2ND T.A. | 1ST T.A. | |
| P, N | | | | | | | | | | |
| R | ○ | ○ | ○ | | | | ○ | LOW | RW | |
| D 1 | ○ | | ○ | | | | × | LOW | 1ST | 2.804 |
| D 2 | ○ | | | ○ | | | × | HIGH | 1ST | 1.977 |
| D 3 | ○ | | ○ | | × | ○ | | LOW | 2ND | 1.532 |
| D 4 | ○ | | | ○ | × | ○ | | HIGH | 2ND | 1.080 |
| D 5 | ○ | ○ | ○ | | | ○ | | LOW | 3RD | 1.000 |
| D 6 | ○ | ○ | | ○ | | ○ | | HIGH | 3RD | 0.705 |

FIG. 6A

E PATTERN

VEHICLE SPEED

FIG. 6B

P PATTERN

VEHICLE SPEED

SHIFT CONTROL SYSTEM AND METHOD FOR AUTOMATIC TRANSMISSION

BACKGROUND OF THE INVENTION

The present invention relates to an automatic transmission, in which first and second transmission assemblies capable of controlling shifts individually are connected in tandem, and, more particularly, to a shift control system for use with the automatic transmission, in which gear stage trains to be adopted are changed in dependence upon the running conditions.

There is known an automatic transmission in which a first transmission assembly capable of shifting first to third speeds and a second transmission assembly capable of shifting two higher and lower speeds are connected in tandem. This automatic transmission is exemplified by Japanese Patent Laid-Open No. 61-244957 where six forward speeds can be shifted.

Here, the number of gear stages required for the actual running is mostly satisfied by four or five. As a result, the automatic transmission capable of setting totally six gear stages, as disclosed in the above-specified Laid-Open, is disadvantageous in that the shifts are frequently caused with a slight change in the vehicle speed. Since, in the disclosed automatic transmission, the first transmission assembly and the second transmission assembly have their shifts separately controlled, both of them will may happen to be simultaneously shifted such that one is brought into an upshift and the other into a downshift, in this case, another disadvantage arises in that the controls must be made complex for reducing the shifting shocks or in that the shocks are increased because the shift·timing is not adequately controlled.

A system for eliminating those disadvantages is disclosed in Japanese Paten: Laid-Open Mo. 60-116953. In the automatic transmission capable of selecting a power pattern and an economy pattern by means of a pattern select switch, according to the disclosure. the system is constructed to have different gear stage trains in dependence upon the power and economy patterns selected, in this system, the automatic transmission is shifted sequentially in the order of 1st, 2nd . . . and so on speeds in accordance with the vehicle speed or the engine load, if the power pattern is selected. From the gear stage trains for the economy pattern, there is eliminated such a specific gear stage as is difficult to control the shifts: from the 2nd to 3rd speeds, for example. As a result, the shifts are accomplished in the order of the 1st, 2nd, 4th, . . . , and so on speeds.

The automatic transmission thus enabled to select the gear stage trains manually is excellent in that the vehicle has its drivability improved because its power characteristics can be selected by the driver himself.

In the automatic transmission capable of changing the gear stage trains on the basis of the running conditions such as the selected running pattern, a shift is caused by switching the running pattern even if the vehicle speed and/or the engine load are unvaried. Let the case be considered, in which a shift is caused by the change in the running pattern in the automatic transmission in which the individual shift-controlled first and second transmission assemblies are connected in tandem, if the shift is one to be achieved by shifting the first and second transmission assemblies, it is difficult to make proper the timing of the shifts at the individual transmission assemblies. Especially if the first and second transmission assemblies are to be shifted oppositely cf each other, the shift is difficult to smoothen, and the shifting shocks may possibly be great.

SUMMARY OF THE INVENTION

An object of the present invention is to prevent serious shifting shocks by inhibiting the shift which might otherwise be achieved by simultaneously shifting the first and second transmission assemblies connected in tandem.

Another object of the present invention is to inhibit that change of the gear stage trains, which could not be effected without being followed by the simultaneous shifts of the first and second transmission assemblies.

According to one aspect of the present invention, therefore, there is provided a shift control system for an automatic transmission including first and second transmission assemblies, which are arranged in tandem to have their shifts controlled individually, and capable of selecting at least two gear stage trains, each being composed of a plurality of gear stages set by combining said first and second transmission assemblies, which are decided under a predetermined condition, comprising: running condition judgment means for judging the present running conditions including the currently selected gear stages; gear stage train decision means for deciding such one of said gear stage trains as is suited for said running conditions; gear stage train change means for changing a currently selected gear stage train to another gear stage train decided by the gear stage train decision means; simultaneous shift judgment means for judging if a change from said currently selected gear stage train to said decided gear stage train produces a simultaneous shift of both said first transmission assembly and said second transmission assembly; and gear stage train change inhibition means for inhibiting a change to said decided gear stage train if the Simultaneous shifts are judged.

According to another aspect of the present invention, there is provided a shift control method for an automatic transmission including first and second transmission assemblies, which are arranged in tandem to have their shifts controlled individually, and capable of selecting at least two gear stage trains, each being composed of a plurality of gear stages set by combining said first and second transmission assemblies, which are decided under a predetermined condition, comprising: judging the present running conditions including the currently selected gear stages; deciding such one of said gear stage trains as is suited for said running conditions; making a decision to change a currently selected gear stage train to another gear stage train judging it to if a change currently selected from said gear stage train to said decided gear stage train produces a simultaneous shift of both said first transmission assembly and said second transmission assembly; inhibiting a change to said decided gear stage trains if the simultaneous shifts are judged.

The above and further objects and novel features of the present invention will more appear from the following detailed description when the same is read in connection with the accompanying drawings, it is to be expressly understood, however, that the drawings are for the purpose of illustrations only and are not intended as a definition of the limits Of the invention.

DETAILED DESCRIPTION OF THE PREFERRED EMBODIMENT

Figure 1:
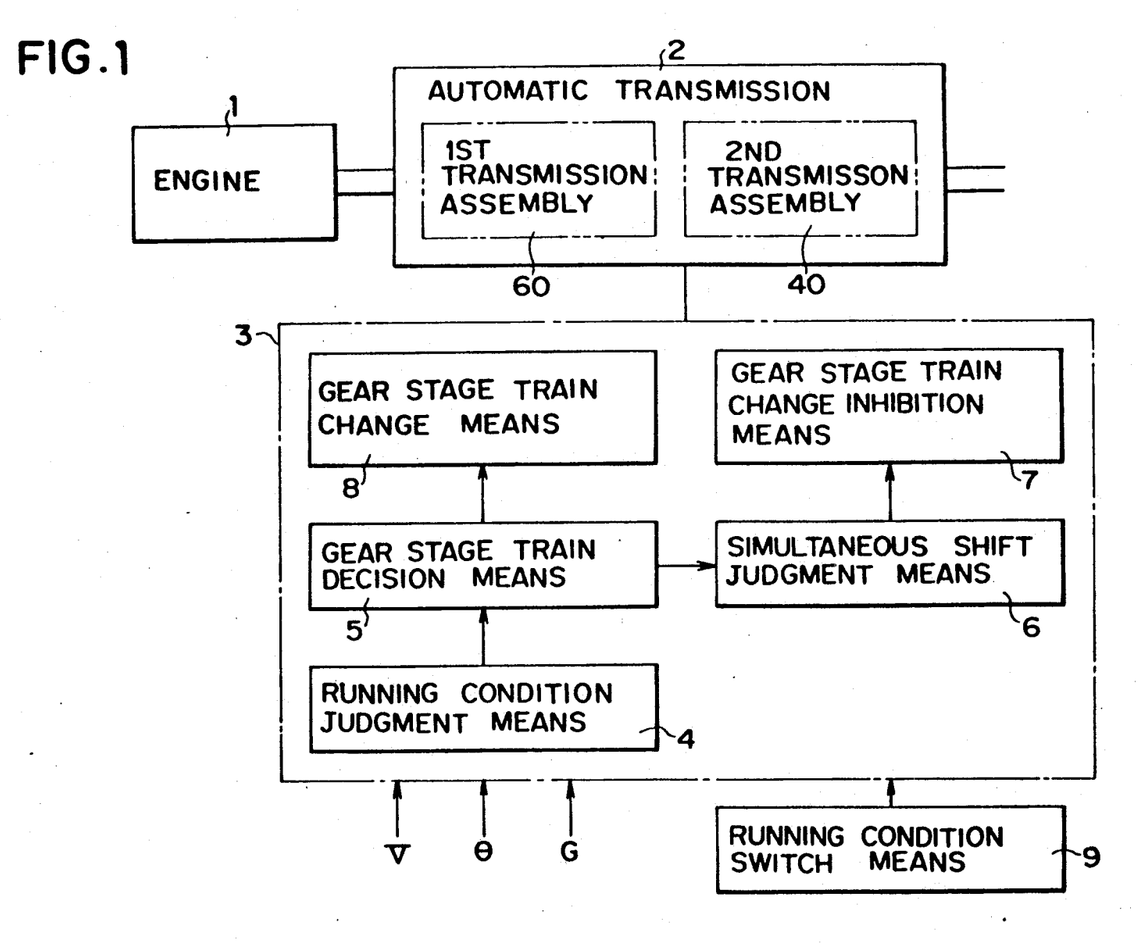
FIG. 1 is a block diagram for explaining the fundamental structure of the present invention.

In FIG. 1, an automatic transmission 2 is connected to an engine 1 and is constructed of a first transmission assembly 60 and a second transmission assembly 40. The first transmission assembly 60 is enabled to set three forward gear stages, for example, whereas the second transmission assembly 40 is enabled to set at least two, low and high, gear stages. The second transmission assembly 40, and the first transmission assembly 60 are connected in tandem to the engine 1. As a result, the automatic transmission 2 can set six forward gear stages.

A shift control system 3 according to the present invention is constructed of running condition judgment means 4, gear stage train decision means 5, simultaneous shift judgment means 6, gear stage train change inhibition means 7, gear stage train change means 8 and running condition switch means 9. The shift control system 8 thus constructed is enabled to determine a gear stage on the basis of input information such as a vehicle speed V, a throttle opening $\theta$, a present gear stage G and a shift position.

Specifically, the running condition judgment means 4 judges the running conditions in which the shift pattern is the power pattern or the economy pattern or on whether the overdrive is allowed. The gear stage train decision means 5 decides whether or not a gear of the stage train matches the set running conditions. Moreover, the simultaneous shift judgment means 6 judges whether or not a change in the selected gear train produces a shift to be executed in which the first transmission assembly 60 and the second transmission assembly 40 are shifted simultaneously. The gear stage train change inhibition means 7 inhibits the change to the gear stage train decided by the gear stage train decision means 5, if the simultaneous shift is judged. Furthermore, the gear stage train change means 8 effects the change to the gear stage train, which has been decided by the gear stage train decision means 5, unless the simultaneous shift is judged. The running condition switch means 9 includes a shift Pattern select switch, an overdrive switch, an Idling contact switch and so on so that it switches the running conditions such as the shift pattern or the overdrive on the basis of the signals inputted from those switches.

A more specific embodiment will be described in the following.

Figure 3:
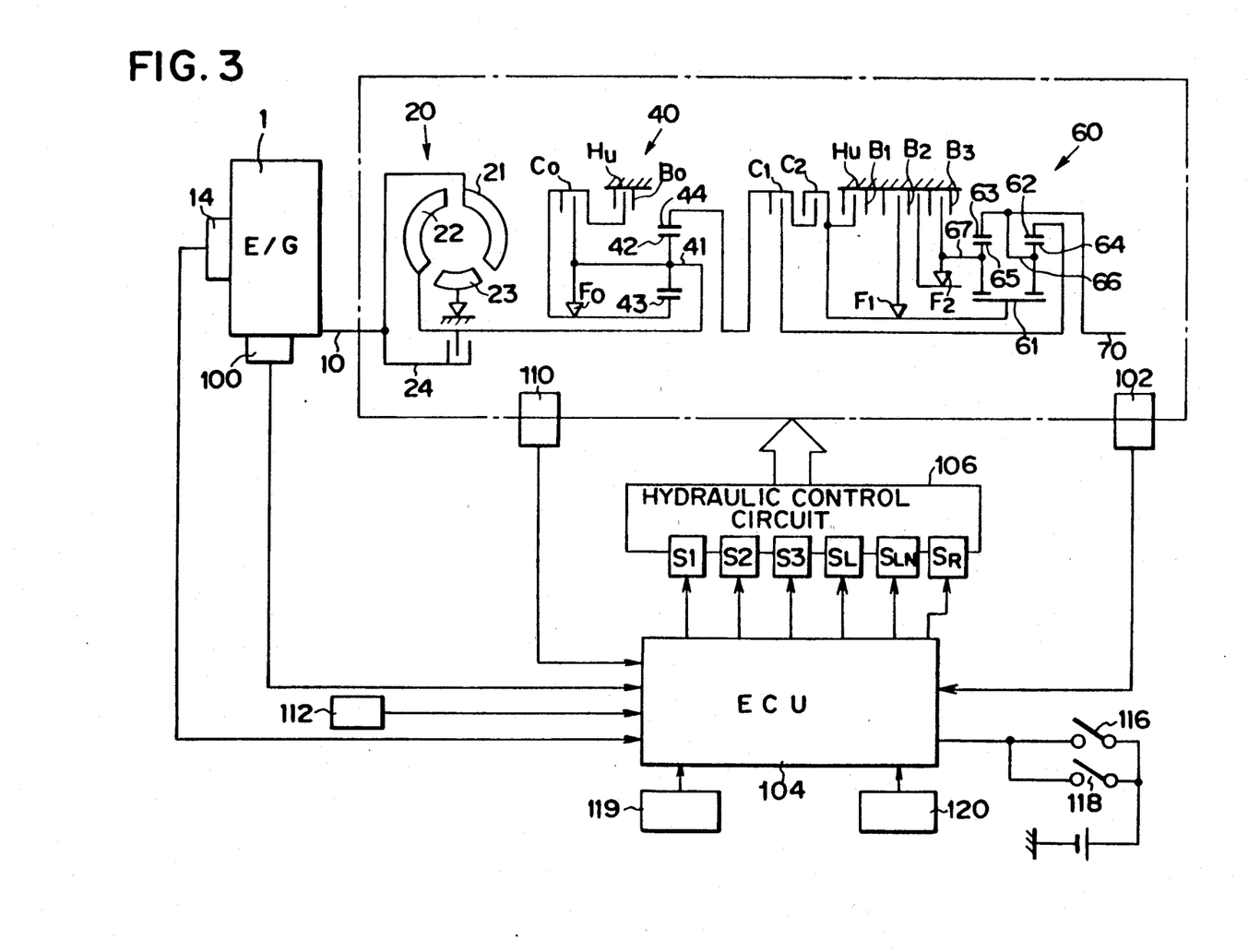
FIG. 3 is a skeleton diagram showing an embodiment of the present invention.

FIG. 3 is a diagram showing the whole structure of a vehicular automatic transmission, to which the embodiment of the present invention is applied.

This automatic transmission is equipped as its transmission mechanism with a torque converter 20, the second transmission assembly 40 and the first transmission assembly 60 having forward three gear stages and reverse one gear stage.

The torque converter 20 is composed of a pump 21, a turbine 22, a stator 23 and a look-up clutch 24. The pump 21 is connected to the crankshaft 10 of the engine 1, and the turbine 22 is connected to a carrier 41 of a planetary gear set of the second transmission assembly 40.

In this second transmission assembly 40, a planetary pinion 42 is rotatably supported by the carrier 41 and meshes with a sun gear 48 and a ring gear 44. Moreover, a clutch $C_o$ and a one-way clutch $F_o$ are interposed between the sun gear 13 and the carrier 41, and a brake $B_o$ is interposed between the sun gear 43 and a housing Hu.

The aforementioned first transmission assembly 60 is equipped with front and rear planetary gear sets. These planetary gear sets are individually composed of a shared sun gear 61, ring gears 62 and 63, planetary pinions 64 and 65, and carriers 66 and 67.

The ring gear 11 of the second transmission assembly 40 is connected through a clutch $C_1$ to the aforementioned ring gear 62. A clutch $C_2$ is interposed between the aforementioned ring gear 44 and sun gear 61. Moreover, the aforementioned carrier 66 is connected to the aforementioned ring gear 63 and carrier 66 and ring gear 68 are connected to an output shaft 70. On the other hand, a brake $B_3$ and a one-way clutch $F_2$ are interposed between the aforementioned carrier 67 and housing Hu. A brake $B_2$ is interposed through a one-way clutch $F_1$ between the sun gear 61 and the housing Hu. A brake $B_1$ is interposed between the sun gear 61 and the housing Hu.

Figure 4:
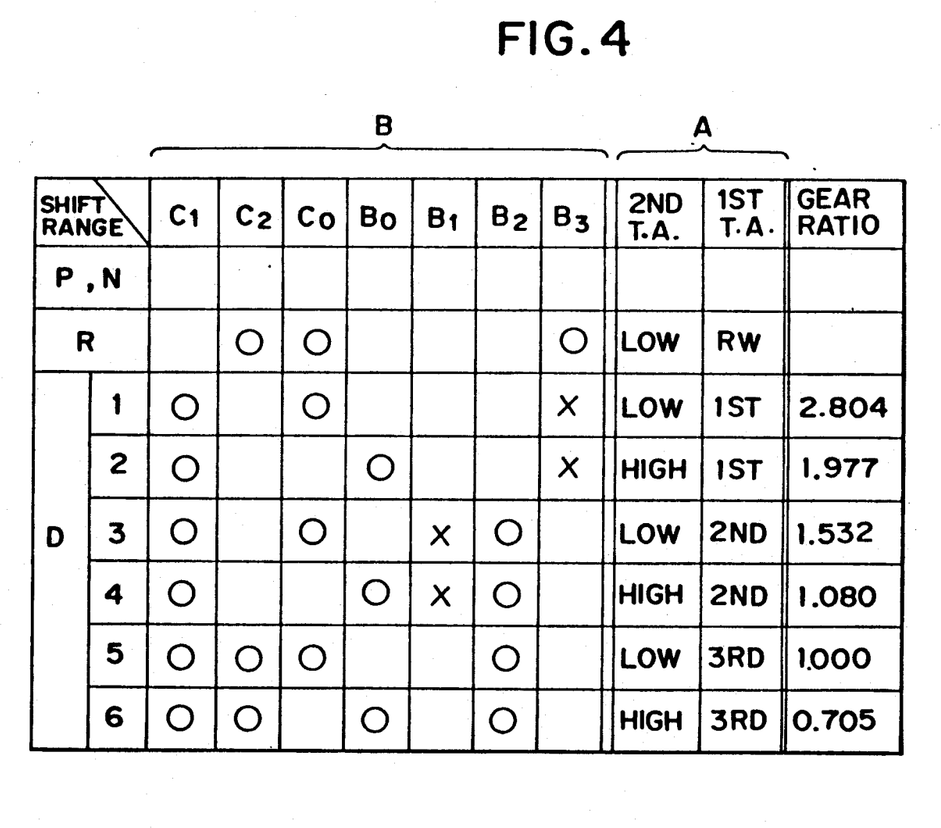
FIG. 4 is a clutch and brake application showing tabulating the engaged states of frictional engagement means of the automatic transmission shown in FIG. 3.

In the automatic transmission which is equipped with the transmission mechanism described above, an electronic control unit (ECU) 104 is adapted to be fed with the signals of a throttle sensor 100 for detecting the throttle opening reflecting the load state of the engine 1 and a vehicle speed sensor 102 for detecting the vehicle speed. By the controls of the electronic control unit 104, solenoid valves $S_1$ to $S_3$ in a hydraulic control circuit 106 are selectively energized according to a shift map selected by a later-described control routine, so that the automatic transmission Is shifted by the combination of engagements of the individual clutches and brakes, as tabulated in Column B cf FIG. 4.

in FIG. 4, symbols $\bigcirc$ indicate the engaged states, and symbols $\times$ indicate the engaged states to be taken only at the time of an engine braking range such as an L-range or 2nd range.

Figure 5:
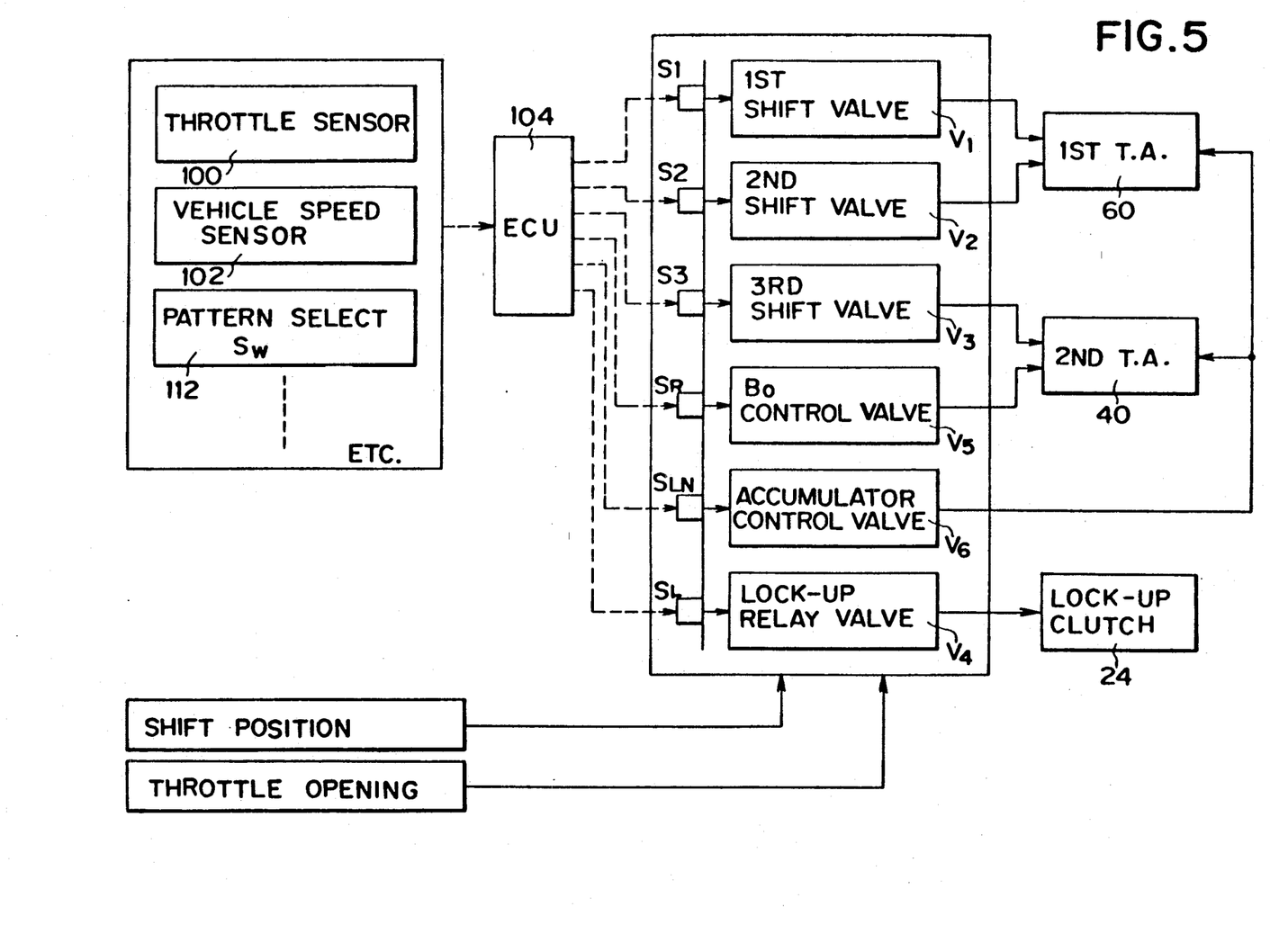
FIG. 5 is a block diagram showing the flows of control signals.

As shown in FIG. 8, the aforementioned solenoid valves $S_1$ and $S_2$ control first and second shift valves $V_1$ and $V_2$ of the first transmission assembly 60. The solenoid valve $S_3$ controls a third shift valve $V_3$ for switching the high and low speed sides of the second transmission assembly 40. A solenoid valve $S_L$ controls the lock-up clutch 24 of the torque converter 20 through a look-up relay valve $V_4$. Moreover, a linear solenoid valve $S_R$ is enabled to control the oil pressure of the brake $B_o$ arbitrarily through a $B_o$ control valve $V_5$. A linear solenoid valve $S_{LN}$ is enabled to control the back pressure of an accumulator arbitrarily through an accumulator control valve $V_6$.

Incidentally, these specific structures and operations of the components themselves of the hydraulic control circuit are not especially different from those of the prior art.

In FIG. 3, reference numeral 110 designates a shift position sensor for detecting the position of that one of an N-range, a D-range, an R-range and so on, which is selected by the driver. Numeral 112 designates a pattern select switch for selecting the economy pattern (aiming at an economical run) and a power pattern (aiming at a powerful run). Numeral 14 designates a water temperature sensor for detecting the temperature of the engine cooling water. Numeral 116 designates a brake switch for detecting the depression of the foot brake pedal. Numeral 118 designates a brake switch for detecting the application of the side brake. Numeral 119 designates an overdrive switch for inhibiting the overdrive run (i.e., the run at the 6th speed) manually. Numeral 120 designates an idle contact switch which is turned on only if the throttle is fully closed.

Figure 2:
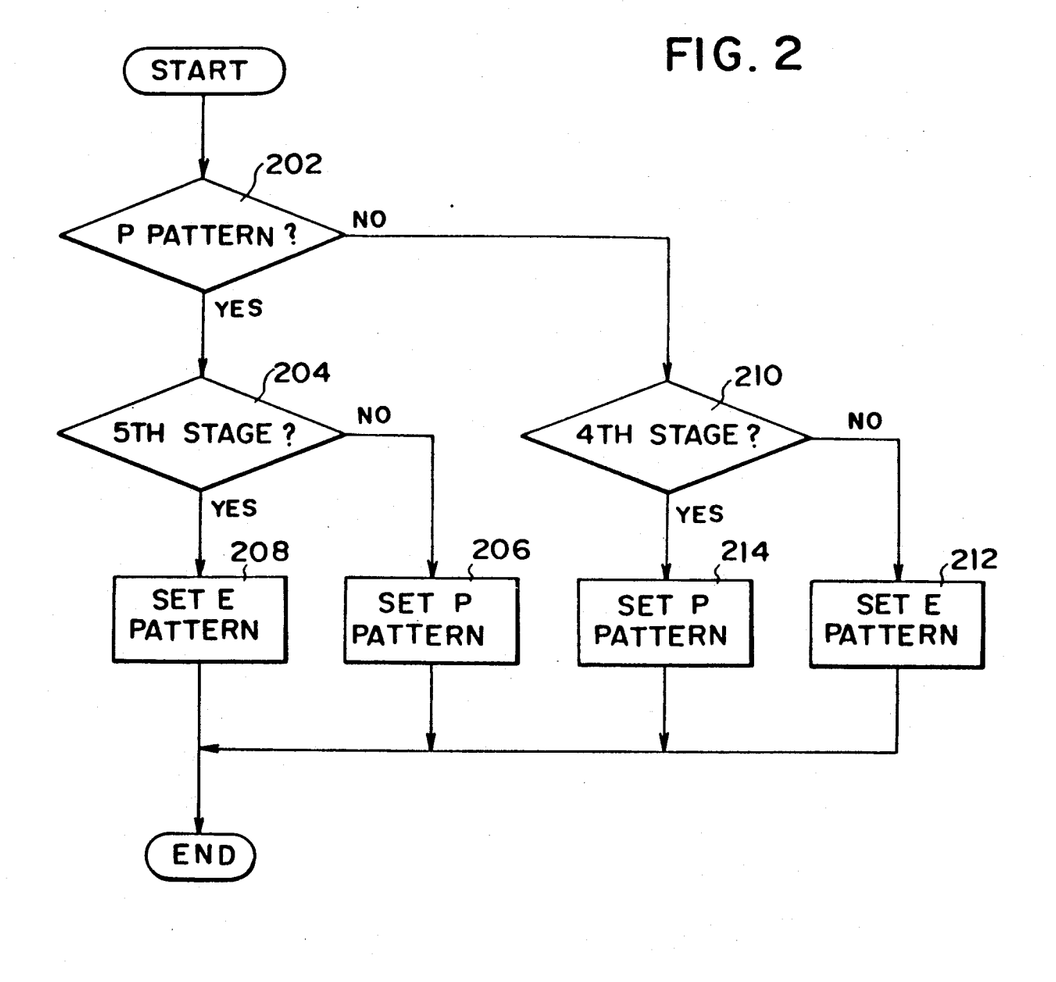
FIG. 2 is a flow chart showing a fundamental control routine.

FIG. 2 presents a selective control routine of a shift map to be executed in the system of the embodiment.

First of all, it is decided at Step 202 whether or not the pattern select switch 112 is positioned at present in the power (P) pattern. If YES, the routine advances to Step 204, at which it is decide whether or not the present gear stage is at the 5th speed.

If it is decided that the pattern is in the power and that the present gear stage is not at the 5th speed, the gear stage train for the power pattern is set (at Step 206) without any change because there is no specific problem.

If, on the contrary, it is decided that the pattern is in the power but that the gear stage is at the 5th speed, the routine is proceeded to Step 208, at which the gear stage train for the economy pattern is set, even with the power pattern being selected, as for the reason set forth in the following.

Figure 6A:
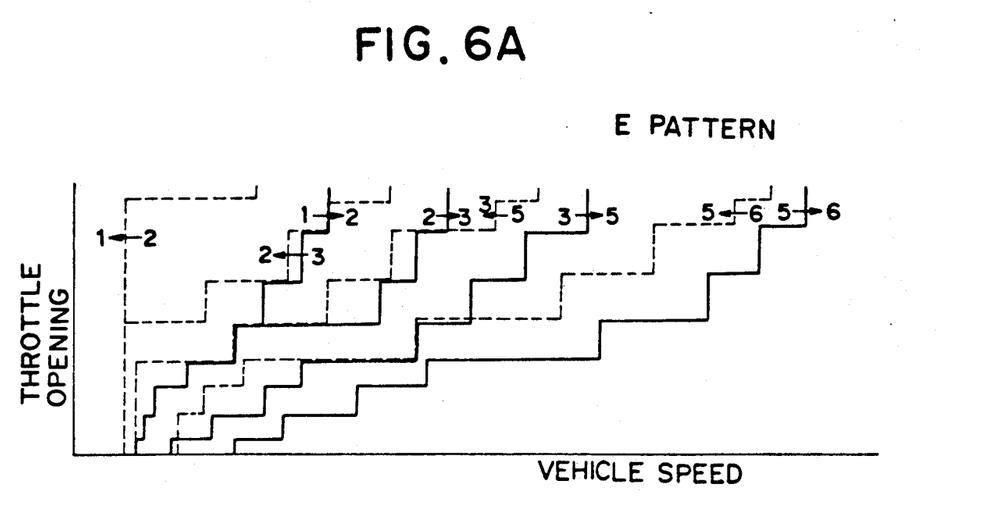
FIGS. 6(A) and 6(B) are diagrams exemplifying individual gear stage trains.
Figure 6B:
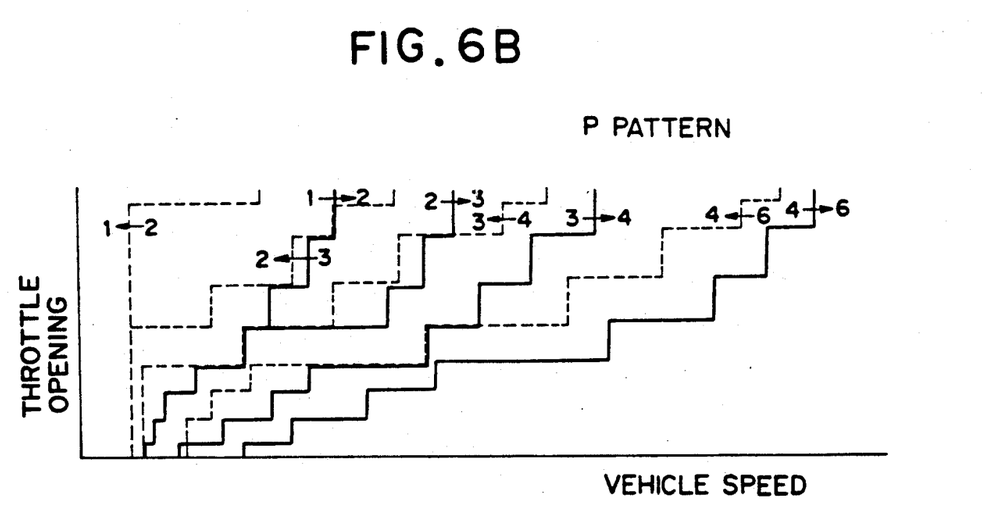

FIG. 6(A) plots the shift patterns which are adopted if the economy pattern is selected, and FIG. 6(B) pots the shift patterns which are adopted if the power pattern Is selected. In the economy pattern, as apparently seen from FIG. 6(A), the shifts will proceed according to the gear stage train of the 1st, 2nd, 3rd, 5th and 6th speeds. in the power pattern, on the other hand, the shifts will proceed according to the gear stage train of the 1st, 2nd, 3rd, 4th and 6th speeds. This difference arises because the powerfulness is stressed to enrich the lower gear stages in the power pattern whereas the mileage is stressed to enrich the higher gear stages in the economy pattern.

As is now apparent from FIGS. 6(A) and 6(B), the 5th speed could never be selected in the power pattern. Hence, the proceeding of the control process to Steps 202 and 204 means the economy pattern has been switched to the power pattern, if, in this case, the switching to the power pattern is abruptly caused, it is always followed at that instant by the shift from the 5th to 6th speeds or from the 5th to 4th speeds, because the 5th speed is absent from the power pattern.

The former shift from the 5th to 6th speeds will raise no serious shifting shocks because it is effected by the second transmission assembly 40 only. On the contrary, the latter shift from the 5th to 4th speeds is effected by shifting the first transmission assembly 60 and the second transmission assembly 40 simultaneously in opposite directions (as could be seen from FIG. 4) so that it is difficult to control and liable to be followed by heavy shifting shocks. Moreover, the change from the economy pattern to the power pattern is generally intended by the driver requiring a higher power performance so that shifting from the fifth to the fourth speeds could be said to occur more frequently than the upshift from the 5th to 6th speeds.

As a result, when the present gear stage is at the 5th speed, the economy pattern is still held as it is, even if the power pattern has been selected.

Here, the switching from the economy pattern to the power pattern by the driver means that the driver has selected the pattern stressing the power performance, as described above, and accordingly the accelerator pedal is ordinarily depressed at the same time. As a result, the dominating stage goes out of the 5th speed so that Steps advance along the routine of 202→201→206 in the subsequent process. At Step 206, the power pattern is set.

If, on the other hand, it is judged at Step 202 that the position of the pattern select switch 112 falls in the economy pattern, the control process advances to Step 210, at which it is judged whether or not the present gear stage is at the 4th speed. If NO, the process advances to Step 212, at which the economy pattern is set, because there will arise no special problem.

If It is judged that the pattern is the economy one and that the present gear stage is at the 4th speed, it means that the pattern has just been switched from the power to economy patterns. This is because the 4th speed is not selected in the economy pattern. Since, in this case, the 4th speed cannot be maintained in the economy pattern, a shift from the 4th to 5th speeds may follow the setting, if any, of the economy pattern, in this case, it should be noted that the shift from the 4th to 5th speeds is caused by shifting the first transmission assembly 60 and the second transmission assembly 40 simultaneously in the opposite directions thereby to increase the shifting shocks. In this case, therefore, the control process is proceeded to Step 214 to hold the power pattern.

Generally speaking, the switching from the power pattern to the economy pattern is intended by the driver to power rather than mileage. Therefore, this switching is ordinarily accompanied by the operations such as a release of the accelerator pedal. As a result, the gear shift is frequently directed from the 4th to 6th speeds At the instant of this shift, the control process advances along the routine of Steps 202→210→212 so that the economy pattern is set.

According to the present embodiment, however, the switching, if any, from the economy pattern to the power pattern at the 5th speed or vice versa at the 4th speed will ignore the intention of the driver so long as the gear state is maintained at the 5th or 4th speed.

However, the maintenance at the 5th or 4th speed means that the driver is not operating the accelerator pedal so much and accordingly desires neither any acceleration nor deceleration from the existing run so much. Then, it Is not necessary in the least to execute any shift while being concerned with shifting shocks. It could be said, therefore, that no practical problem would arise even if a more or less time difference were present between the switching operation of the driver and the actual switching of the shift pattern (or the gear stage train).

According to the present embodiment, the occurrence of the shift difficult to control, which might otherwise be caused by switching the shift patterns. can be prevented while setting the shift pattern (or the gear stage trains) exploiting the individual features of the economy pattern and the power pattern.

As has been described hereinbefore, according to the present invention, in case the gear stage trains (or the shift patterns) are to be changed as a result of switching the pattern select switch of the overdrive switch, for example, their changes are rapidly effected while considering the intention of the driver if no serious problem is anticipated, in case, on the other hand, uncontrollable simultaneous shifts are anticipated to occur by switching the gear stage trains, this switching is delayed till the situations for the simultaneous shifts are released. This results in that the consideration cf the driver's intention and the more smooth run are made rationally compatible.

What is claimed is:

1. A shift control system for an automatic transmission including first and second transmission assemblies arranged in tandem and individually controlled for selecting at least a first and a second gear stage train, each of said gear stage trains being composed of a plurality of gear stages set by combining said first and second transmission assemblies, comprising:

running condition judgment means for judging the present running conditions including the currently selected gear stage;

gear stage train decision means for deciding such one of said gear stage trains as is suited for said running conditions;

gear stage train change means for changing a currently selected gear stage train to another gear stage train decided by said gear stage train decision means;

simultaneous shift judgment means for judging if a change from said currently selected gear stage train to said decided gear stage train produces a simultaneous shift of both said first transmission assembly and said second transmission assembly; and gear stage train change inhibition means for controlling said gear stage train changing means to inhibit a change to said decided gear stage train if the simultaneous shifts are judged.

2. A shift control system according to claim 1, further comprising:

condition switch means for switching said running conditions.

3. A shift control system according to claim 2, wherein said condition switch means includes a pattern select switch for selecting one of a first running pattern for shifting by said first gear stage train and a second running pattern for shifting by said second gear stage train.

4. A shift control system according to claim 2, wherein said condition switch means includes an overdrive switch to for switching an overdrive mode allowing the setting of the highest stage and to a non-overdrive mode inhibiting the setting of the highest stage.

5. A shift control system according to claim 2, wherein said condition switch means includes an idle contact switch to be turned on when in an idling operation.

6. A shift control system according to claim 3, wherein said first gear stage train includes individual gear stages which establish higher output torques than those established by the gear stages of said second gear stage train.

7. A shift control system according to claim 1,
   wherein said first gear stage train sets three forward gear stages, and
   wherein said second gear stage train sets two forward gear stages.

8. A shift control system according to claim 7,
   wherein said first transmission assembly has two planetary gear sets, and
   wherein said second transmission assembly has one planetary gear set.

9. A shift control system according to claim 1, wherein said gear stage train inhibition means comprises means to inhibit the change to the decided gear stage trains if the simultaneous shift is achieved by an upshift of said first transmission assembly and a downshift of said second transmission assembly.

10. A shift control method for an automatic transmission including first and second transmission assemblies arranged in tandem and individually controlled for selecting at least a first and a second gear stage, each of said gear stage trains being composed of those of a plurality of gear stages set by combining said first and second transmission assemblies, comprising the steps of:

judging the present running conditions including a currently selected gear stage;

deciding such one of said gear stage trains as is suited for said running conditions;

making a decision to change a currently selected gear stage train to another gear stage train;

judging if a change from said currently selected gear stage train to said decided gear stage train produces simultaneously shifts of both said first transmission assembly and said second transmission assembly; and inhibiting a change to said decided gear stage train if the simultaneous shifts are judged.

* * * * *

UNITED STATES PATENT AND TRADEMARK OFFICE
CERTIFICATE OF CORRECTION

PATENT NO. : 5,109,731
DATED : 05/05/92
INVENTOR(S) : IWATSUKI ET AL

It is certified that error appears in the above-identified patent and that said Letters Patent is hereby corrected as shown below:

Column 8, line 1, after "switch" delete "to" and after "switching" insert --to--;

line 32, after "stage" insert --train--;

line 44, change "simultaneously" to --simultaneous--.

Signed and Sealed this

Twenty-eighth Day of September, 1993

Attest:

BRUCE LEHMAN

Attesting Officer     Commissioner of Patents and Trademarks